Patented Jan. 26, 1943

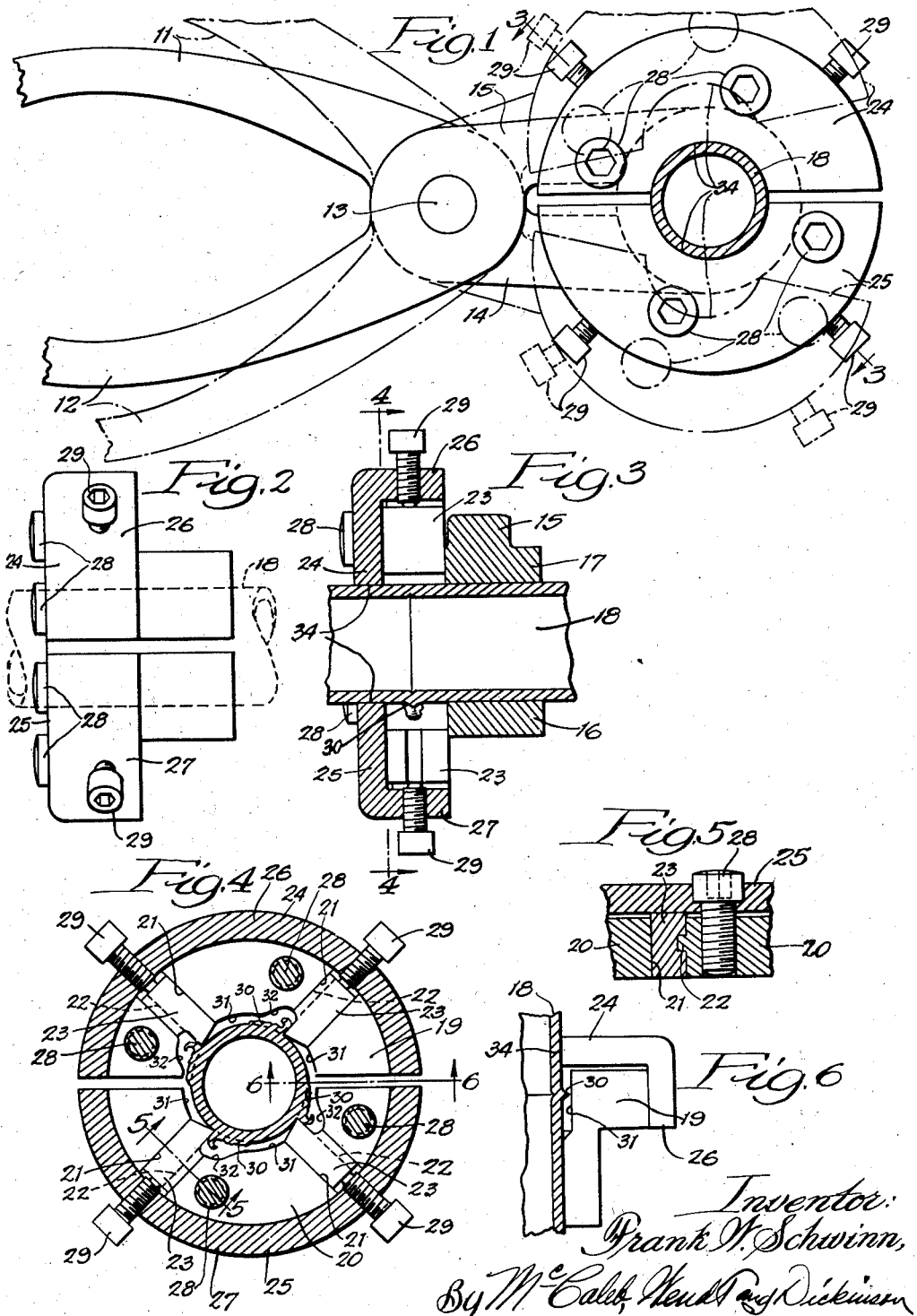

2,309,218

UNITED STATES PATENT OFFICE 2,309,218

WELDING FLASH TRIMMER

Frank W. Schwinn, Chicago, Ill.

Application April 23, 1941, Serial No. 389,855

9 Claims. (Cl. 82—4)

The present invention relates to a flash trimmer, and is particularly concerned with a tool for trimming the flash left by the butt-welding of two tubes.

It is common practice in the fabrication of tubular structures to join the ends of similar tubing members by means of butt flash welding, which consists in placing the tubes in aligned, abutting relation in a suitable jig or fixture, and then passing an electrical current through the abutting tubular end portions to fuse the edges of the tubes, thereby to weld the tubes together. In performing this operation, the tubes are subjected to a compressive force, tending to press the abutting ends toward each other, so that when the weld fuses the metal, the ends are permitted to approach each other slightly, thereby to displace outwardly a small quantity of the welded metal, which forms a fin, or as it is usually called, a flash projecting outwardly from the welded area entirely around the tube.

When such a butt flash welding operation is performed on relatively short tube lengths, which are not incorporated in a fabricated structure, it is a simple matter to trim the flash caused by the welding operation by simply chucking the piece in a suitable lathe or other rotating device, and, by bringing a suitable tool such as a lathe cutting tool into use, to trim the fin or flash from the weld.

When the tube is a part of a fabricated structure, however, such as a bicycle frame, or an airplane fuselage, it is obviously impossible to use such flash trimming method, and it becomes a difficult matter at times to reach the fin or flash for suitable trimming. In close quarters it frequently is necessary to use a file or other hand tool in order to remove the flash, which is a slow and costly method, and is apt to result in undercutting or removing too much metal in spots with a resultant weakening of the structure.

Thus an object of my invention is a flash trimmer for butt-welded tubes having some—and preferably all—of the following features:

The trimmer is a simple hand tool.

It is small enough to be turned about welded tubes even after the welded tubes are assembled in a bicycle frame, for example, (as distinguished from a trimmer where the welded tubes must be turned in a lathe device).

The depth of cut is limited to the diameter of the adjoining tubes, so that the trimming may safely be brought just flush.

The cut is confined to concentricity with the adjoining tubes, further insuring a flush trim.

The cut is readily adjustable as the trimmer is turned about the flash, so that excessive resistance may be avoided by reducing the flash gradually by a fine cut.

The trimming may be effected in only a fraction of a revolution.

The tool may be applied to, and removed from, the tube either transversely or endwise thereof.

The features are preferably economically realized by simple plier-type handles and toothed trough-type jaws.

Other objects and advantages of the invention will be apparent from the following description and the drawing in which similar characters of reference indicate similar parts throughout the several views.

Referring to the drawings, of which there is one sheet,

Fig. 1 is a fragmentary plan view of a flash trimmer embodying the present invention, a portion of the head of one side and the end portions of both handles thereof being broken away, the device being illustrated in closed operative position in solid lines, and in open releasing position in dotted lines;

Fig. 2 is a view in end elevation of the structure shown in solid lines in Fig. 1;

Fig. 3 is a sectional view taken on the plane of the line 3—3 of Fig. 1;

Fig. 4 is a sectional view taken on the plane of the line 4—4 of Fig. 3;

Fig. 5 is an enlarged sectional view taken on the plane of the line 5—5 of Fig. 4; and Fig. 6 is an enlarged fragmentary sectional view taken on the plane of the line 6—6 of Fig. 4.

Referring to the drawing in detail, a pair of handle members 11 and 12 are pivotally joined to each other as by means of a pin 13 in the manner of a pair of pliers. Each of the handles 11 and 12 has an integrally formed jaw 14 and 15, respectively. The jaws 14 and 15 are each formed with a trough-shaped guide portion 16 and 17, respectively, the inner faces thereof being curved to receive a tube 18 therein. The recesses are of the same internal radius as the outside radius of the tube 18 which they are designed to trim, and extend through slightly less than 180° of arc, so that when seated against the periphery of a tube 18 as illustrated in Fig. 3, the inner edges of the guide members 16 and 17 will be separated slightly as illustrated in Figs. 1, 2 and 4.

The guide members 16 and 17 are each formed with an enlarged head portion 19 and 20, see Figs. 4, 5 and 6, and each of these head portions 19 and 20 is formed with two radially disposed rectangular tool receiving recesses therein, each of the recesses 21 having an inwardly projecting guide tongue 22. Four similar cutter blades 23 are provided, one in each of the recesses 21, the blades each having a groove longitudinally of a side thereof to receive the tongues 22, thereby to guide the blades in their respective recesses. The inner ends of each of the blades 23 are ground to have a straight cutting edge as illustrated in Fig. 4, all of the cutting edges of the four blades being disposed in the same direction with respect to a predetermined direction of rotation of the trimming tool, such as the counter-clockwise direction illustrated in Fig. 4.

The blades 23 are slightly wider than the recesses in the head portions 19 and 20, so that the blades project laterally slightly beyond the faces of the head portions 19 and 20, as best illustrated in Figs. 3 and 5. A pair of substantially semi-circular blade retaining members 24 and 25 are provided one on each of the head portions 19 and 20, respectively, each of these blade retaining members being provided with a peripheral flange 26 and 27, respectively. A notch 34 is formed in the center of the straight diametral edge of each of the members 24 and 25, the surfaces defining the notches having the same radius of curvature as the outside of the tube 18. The members 24 and 25 are secured to their respective head portions by means of cap-screws 28 which here are illustrated as of the recessed head type. The cap-screws 28 are employed to draw the blade retaining members 24 and 25 tightly against the sides of the blades 23 to secure the blades in adjusted position.

Two radially disposed cap-screws 29 are threaded through each of the flanges 26 and 27 to lie radially beyond each of the blades 23. These cap-screws 29 are adapted to bear against the ends of the blades 23 to support them in radially adjusted position.

In using the device the four blades 23 are first adjusted to the proper cutting position, which may be accomplished by loosening the four cap-screws 28 sufficiently to free the blades 23 for longitudinal movement within their respective recesses. The tool may then be gripped tightly around a tube of the same diameter as the tube 18 for which the tool is designed, and the cap-screws 29 may be turned either outwardly or inwardly as required until the cutting edges of the blades 23 are all in contact with the periphery of the tube 18.

Such adjustment insures the flash being cut off clean and flush with the surfaces of the adjoining tubes, and eliminates the danger of undercutting and consequent weakening of the welded structure. In case any of the blades 23 should accidentally be projected inwardly farther than is desirable, they may be moved outwardly slightly by unscrewing the respective set screws 29 and forcing the blades out by pressure against the edged end of the blades. When all the blades are in adjusted position, the blades are locked in such position by drawing down on the cap-screws 28 to force the members 24 and 25 into lateral compression with the blade as illustrated in Figs. 3 and 5.

With the blades thus properly adjusted, in order to trim the flash from a butt-weld, the jaws are opened by separating the handles as illustrated in the dotted line positions of Fig. 1, and the jaws are then placed about the tube 18 from which the flash is to be trimmed. With the blades 23 directly over the flash as illustrated in Fig. 3, the jaws are then manually moved to the closed line position illustrated in Fig. 1. With a suitable degree of pressure on the handles, which pressure can readily be determined after one or two uses by the operator, the tool is then moved rotatably about the tube in the direction of the cutting edges as illustrated in Fig. 4. Assuming that sufficient pressure is exerted on the handles 11 and 12 to bring the tools 23 into position to cut the flash 30 completely away in a single pass of the tool, the flash will be completely eliminated by a rotation of the tool slightly in excess of 90°.

A clearance recess 31 is provided on the inner faces of the head portions 19 and 20 so as to permit the flash 30 to rotate freely with respect to the inner surface of the head portion. An additional clearance space 32 is provided ahead of each cutting edge of the blade 23 to provide a chip clearance space for the accumulation of chips which are severed from the flash during an operation of the tool.

The present flash trimming instrument can be used in extremely limited space, and, for complete flash trimming requires a rotation of but approximately 90° for the complete trimming of the flash throughout the entire 360° of the periphery of the tube.

The instrument is also capable of use by inexperienced operators, since if the cutting blades 23 are properly adjusted, it is impossible to injure the tubes by excessive cutting as the inner faces of the recesses in the portions 16 and 17 limit the depth of the cut.

Although the tool finds its principal advantage in the trimming of flashes from tubes assembled into structures which are difficult if not impossible to mount on a rotating head, it has been found nevertheless, that the tool is also extremely useful in the production trimming of flash from welded tubes even when the tubes are capable of being chucked. The use of the present tool on such chucked pieces has been found to possess the further advantage that when operations are rushed, it permits the use of a machine which may be old or in which the bearings are not sufficiently true for precision work, since the tool provides its own guide for proper cutting depth.

The semi-cylindrical troughs of the jaws not only limit the cut to the diameter of the adjoining tubes, but they also insure that the trimming, when completed, is concentric with the adjoining tubes. Thus a flush trim results on all sides of the weld.

While I have illustrated a preferred embodiment of my invention, many modifications may be made without departing from the spirit of the invention, and I do not wish to be limited to the precise details of construction as set forth, but desire to avail myself of all changes within the scope of the appended claims.

Having thus described my invention, what I claim as new and desire to secure by Letters Patent of the United States is:

1. A tool for trimming the welding flash from butt-welded tubes, comprising a pair of pivoted handles, a jaw connected to each handle, said jaws having opposed substantially cylindrical complementary recesses therein disposed transversely to the handle, a blade adjustably mounted to have a cutting edge thereof in alignment with a surface defining one of said recesses, each of said jaws having a deeper annular recess adjacent the cutting edge of said blade in its direction of cutting rotation to provide for cutting clearance, and to receive a flash to be trimmed, the cylindrical recess being adapted to receive a tube to be trimmed to limit the depth of a flash trimming cut.

2. A tool for trimming the welding flash from butt-welded tubes comprising a handle, a jaw carried by said handle, said jaw having a substantially cylindrical recess therein, a blade adjustably mounted to have a cutting edge thereof in lateral alignment with a surface defining said recess, said jaw having a chip clearance space adjacent the cutting edge of said blade in its direction of cutting rotation, a tube gripping member mounted opposite to said cylindrical recess, and movable toward and away from the surface defining said recess to force a tube of a size to fit closely within said recess against the surface defining said recess and toward the cutting edge of said blade, the gripping member being movable away from said jaw a distance greater than the diameter of such tube.

3. A tool for trimming the welding flash from butt-welded tubes comprising a pair of pivoted plier-type handles, a jaw connected to each handle, each jaw having a laterally projecting transversely disposed semicylindrical troughed member adapted to close about a tube having the same outer radius as the inner radius of said troughed members, a blade adjustably mounted beyond an end of said troughed members to have a cutting edge thereof in alignment with the inner surface of one of said troughed members, and means for radially adjusting the position of said blade.

4. A tool for trimming the welding flash from butt-welded tubes, comprising a pair of pivoted plier-type handles, a jaw connected to each handle beyond its pivot point, each jaw having an enlarged head portion and each jaw having a laterally projecting semi-cylindrical troughed portion, said troughed portions each having an inner radius equal to the outer radius of a tube to be trimmed by said tool, each of said head portions having a radially disposed blade receiving recess therein, a radially adjustable blade mounted in each of said recesses to have the cutting edge of each of said blades in alignment with the inner surface of said troughed portions, and blade clamping means associated with each of said blades to clamp said blades against the head portion to retain said blades in adjusted position.

5. A tool for trimming the welding flash from butt-welded tubes, comprising a pair of pivoted plier-type handles, a jaw connected to each handle, a laterally projecting semi-cylindrical troughed member carried by each jaw and adapted to close about a tube having the same outer radius as the inner radius of said troughed members, an enlarged head portion carried by each jaw, said head portions each having a central recess lying wholly radially beyond the inner surface of its troughed member, each head portion having a pair of radially disposed blade receiving recesses therein, a blade mounted in each of said recesses to have the cutting edge thereof extending into alignment with the inner surface of said troughed member, each of said blades being of a greater width than said recesses, and a blade retaining member mounted to overlie a face of said head portion to clamp said blades in adjusted position, said blade clamping members each having a substantially semi-circular tube guiding notch in an edge thereof, the surface defining said notch being in alignment with the inner surface of said troughed portions, each of said blade clamping members having a peripheral flange, and a blade adjusting screw threaded through said flange and engaging each of said blades for radial adjustment of said blades.

6. A tool for trimming the welding flash from butt-welded tubes, comprising a pair of pivoted plier-type handles, a jaw connected to each handle, a laterally projecting semi-cylindrical troughed member carried by each jaw and adapted to close about a tube having the same outer radius as the inner radius of said troughed members, an enlarged head portion carried by each jaw, said head portions having complementary semi-annular grooves lying wholly radially beyond the inner surface of its troughed member, each head portion having a pair of radially disposed blade receiving recesses therein, a blade mounted in each of said recesses to have the cutting edge thereof extending into alignment with the inner surface of said troughed member, and a blade retaining member mounted to clamp said blades in adjusted position, said blade clamping members each having a substantially semi-circular tube guiding notch in an edge thereof, the surface defining said notch being in alignment with the inner surface of said troughed portions.

7. A tool for trimming the welding flash from butt-welded tubes comprising a pair of jaw members, said jaws having opposed substantially cylindrical complementary recesses therein, jaw manipulating means for separating said jaws to receive a tube adapted to fit closely within said recesses, and for thereafter clamping said jaws closely about said tube, each of said jaws having a semi-annular groove in each recessed portion to receive a welding flash, and a blade adjustably mounted to have a cutting edge thereof in line with an extension of the cylindrical surface defining a jaw recess, said blade extending transversely of said groove.

8. A hand tool for trimming annular flash from butt jointed tubes, comprising a pair of inter-pivoted levers, arranged plier-wise with opposed handles on one side of a pivot, and jaws on the other side presenting facing cylindrical troughs, and a cutting tooth mounted on one of the jaws axially offset from the troughs of both jaws with its cutting edge in alignment with the cylindrical bore of its trough, the jaws, in the direction of rotation of the cutting member, being cut away for chip and flash clearance radially beyond the limits of the troughs.

9. A hand tool for trimming annular flash from butt jointed tubes, comprising a pair of inter-pivoted levers, arranged plier-wise with opposed handles on one side of a pivot, and jaws on the other side, presenting facing non-cutting guiding surfaces adapted to engage a tube peripheral surface to limit the closure of the jaws with respect to a tube gripped between the jaws, and a cutting tooth mounted on at least one of the jaws laterally offset from the guiding surfaces with its cutting edge in alignment with a guiding surface, the jaws, in the direction of rotation of the cutting member being cut away for chip and flash clearance beyond the limits of the guiding surfaces thereof.

FRANK W. SCHWINN.